United States Patent [19]

Dallos et al.

[11] 4,247,801
[45] Jan. 27, 1981

[54] CATHODE CURRENT CONTROL SYSTEM

[75] Inventors: Andras Dallos, Lincoln; John A. Buckbee, Wellesley; Gordon R. Spencer, Westwood, all of Mass.

[73] Assignee: Raytheon Company, Lexington, Mass.

[21] Appl. No.: 16,860

[22] Filed: Mar. 2, 1979

[51] Int. Cl.[3] .......................................... H01J 29/98
[52] U.S. Cl. .................................. 315/107; 315/291; 315/307
[58] Field of Search ................... 315/10, 94, 106, 107, 315/291, 307; 358/219

[56] References Cited

U.S. PATENT DOCUMENTS

| 3,885,194 | 5/1975 | Schumacher | 315/107 |
| 3,909,662 | 9/1975 | Thomas et al. | 315/106 |
| 3,909,663 | 9/1975 | Thomas et al. | 315/106 |
| 4,149,110 | 4/1979 | Dallos | 315/107 |

Primary Examiner—Eugene R. LaRoche
Attorney, Agent, or Firm—John T. Meaney; Joseph D. Pannone

[57] ABSTRACT

A cathode current control system comprising an electron discharge device having a tubular envelope wherein an electron gun is disposed to beam a cathode current of electrons onto a spaced anode collector electrode, the gun including an electron emitting cathode, an apertured control grid electrode spaced from the cathode, and a further spaced series of beam forming electrodes; and external circuit means connected to the cathode and other electrodes of the device for maintaining the electrodes at respective predetermined electrical potentials relative to the cathode and for maintaining electron emission from the cathode sufficient for providing a predetermined level of cathode current associated with the predetermined electrical potentials of the electrodes.

10 Claims, 2 Drawing Figures

CATHODE CURRENT CONTROL SYSTEM

BACKGROUND OF THE INVENTION

1. Field of the Invention

This invention relates generally to electron discharge device control systems, and is concerned more particularly with a cathode ray type tube connected to control circuitry having means for maintaining cathode current at a predetermined level for a predetermined operating condition of the tube.

2. Discussion of the Prior Art.

An electron discharge device of the cathode ray type generally comprises a tubular envelope having therein an electron gun disposed to direct an electron beam onto a spaced anode target electrode. The anode target may include an imaging screen layer of phosphor material which fluoresces locally when a discrete region thereof is penetrated by beamed electrons. Consequently, the electron gun may be provided with focusing means for directing the beamed electrons onto a discrete area of the imaging screen layer. Also, the tube may be provided with electron deflection means for causing the beam to scan over successive discrete areas of the imaging screen layer in a conventional line-by-line raster pattern. Thus, by suitably modulating the intensity of the scanning electron beam, there may be produced on the imaging screen layer a corresponding visible light image, which may be viewed visually through an adjacent transparent faceplate portion of the envelope.

The electron gun usually comprises an axially aligned series of spaced electrodes including an electrically heated cathode, an apertured control grid, and one or more beam forming electrodes which focus electrons passed through the control grid onto a spot area of the imaging screen layer. Generally, the spot area of the the imaging screen layer is maintained as small as possible in order to provide maximum resolution in the image. However during life test when the tube electrodes are maintained at respective constant potentials, it may be found that the cathode current of the beam has decreased from an initial value. An attempt to return the cathode current to the initial value by making the potential of the control grid less negative results in an increase in the size of the spot produced on the imaging screen layer, thereby degrading resolution.

Therefore, it is advantageous and desirable to provide a cathode ray type tube with external circuitry having means for maintaining cathode current substantially constant for a predetermined control grid bias potential without increasing the size of the spot area on the imaging screen layer.

SUMMARY OF THE INVENTION

Accordingly, this invention provides a cathode current control system comprised of an electron discharge device including a tubular envelope having therein an axially aligned series of electron gun electrodes disposed to beam a predetermined cathode current of electrons onto a spaced anode target electrode. The invention also provides a control circuit means disposed externally of the envelope and electrically connected to electrodes of the tube for maintaining the electrodes at predetermined electrical potentials and maintaining the associated cathode current at the predetermined level.

The electron gun includes a cathode heated electrically to provide a spaced charge limited emission of electrons, an apertured control grid spaced from the cathode and biased at a suitable electrical potential for permitting the flow of the predetermined cathode current from the space charge limited region of the cathode, and a further spaced series of beam-forming electrodes biased at suitable electrical potentials for focusing the predetermined cathode current of electrons onto the spaced anode target electrode.

The control circuit means includes respective sources of predetermined voltages connected to the electrodes of the tube for maintaining them at the desired predetermined electrical potentials, sensing means connected to the cathode for developing an error voltage signal corresponding to a variation in cathode current from the predetermined level, and cathode heating means coupled to the cathode and the sensing means for receiving the error voltage signal and adjusting the heating of the cathode to maintain the cathode current at the predetermined level. The sensing means may include a current sampling resistor connected in series with the cathode for developing a corresponding sampling voltage signal. Also, the sensing means may include a comparator having one input connected to the sampling resistor and another input connected to a reference voltage source for comparing the sampling voltage signal with a reference voltage signal to produce a differential output voltage signal. The cathode heating means may include an adjustable heater current supply connected to a filamentary heater element of the cathode and to the output of the comparator for adjusting current flow through the heater element in accordance with the differential output voltage signal from the comparator.

BRIEF DESCRIPTION OF THE DRAWINGS

For a better understanding of the invention, reference is made in the following detailed description to the accompanying drawing wherein.

DESCRIPTION OF THE PREFERRED EMBODIMENT

Figure 1:
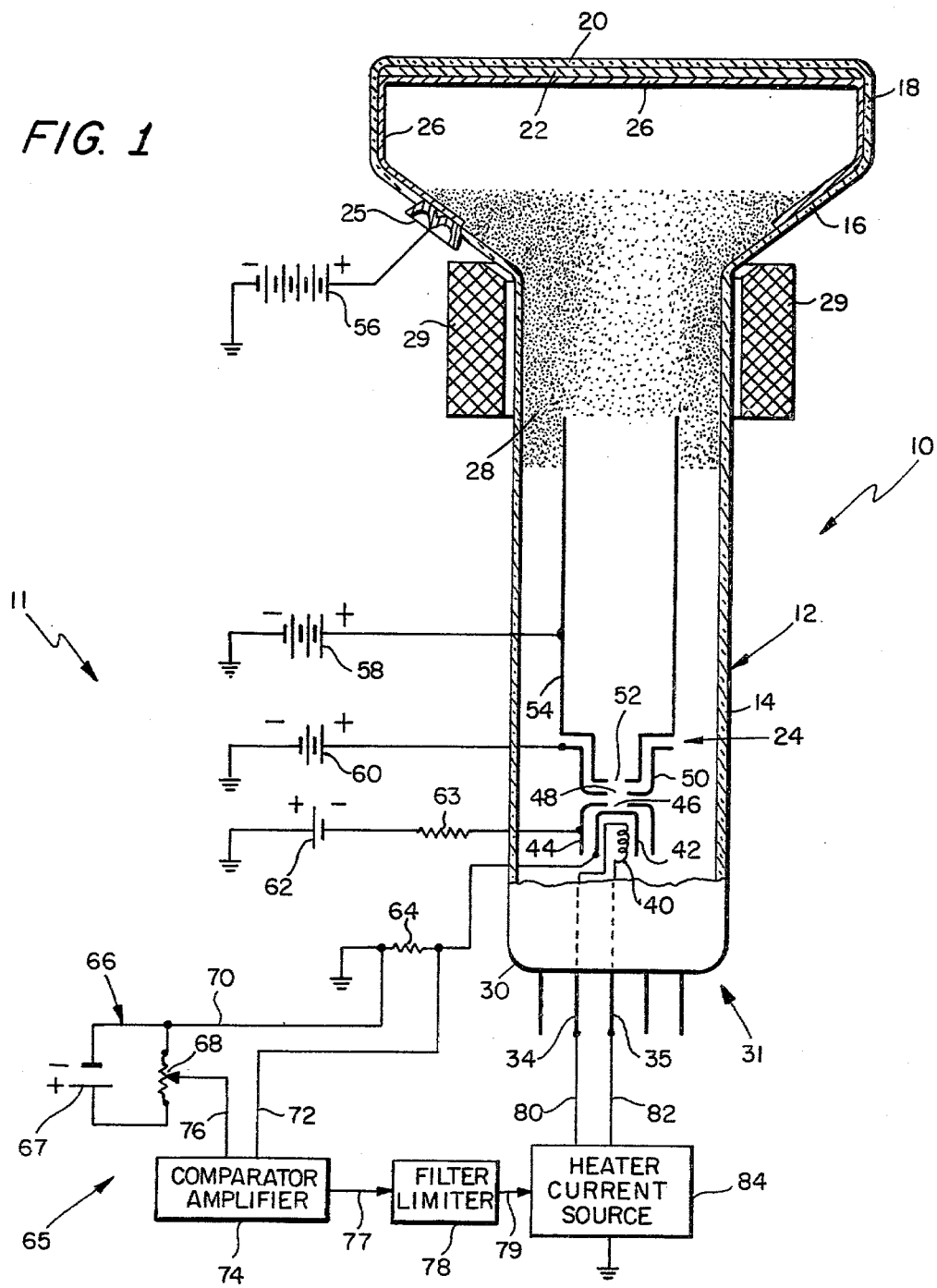
FIG. 1 is a schematic view of a cathode ray tube and connecting control circuitry embodying the invention.

Referring to the drawings wherein like characters of reference designate like parts, there is shown in FIG. 1 a cathode current control system comprising a cathode ray type tube 10 connected to external circuitry 11. The tube 10 comprises an evacuated tubular envelope 12 having a neck end portion 14 intgrally joined by means of an outwardly flared intermediate portion 16 to a larger diameter end portion 18 of the envelope. Portion 18 of envelope 12 terminates in a peripherally sealed faceplate 20 made of transparent material, such as glass, for example.

Disposed on the inner surface of faceplate 20 is an anode target imaging screen 22 comprising a layer of fluorescent material, such as zinc sulfide, for example. The imaging screen 22 fluoresces locally to produce a spot of visible light when a discrete region thereof is penetrated by electrons beamed from an electron gun 24 axially disposed in neck end portion 14 of envelope 12. A conventional electromagnetic yoke 29 may be disposed about a portion of the envelope adjacent the exit end of gun 24 for establishing a transverse variable magnetic field which causes the beam emanating from gun 24 to scan over successive discrete areas of the imaging screen 22 in a well-known raster pattern. As a result, the imaging screen 22 displays a visible light image of the scanned raster pattern, which may be viewed through the adjacent faceplate 20 of tube 10.

A thin coating 26 of conductive material, such as aluminum, for example, may be disposed on the inner surface of imaging screen 22 and on the inner cylindrical surface of larger diameter portion 18 of envelope 12. The coating 26 extends axially and annularly onto the inner cylindrical surface of intermediate portion 18 and is electrically connected to a terminal button 25 hermetically sealed in the wall thereof. Terminal button 25 and conductive coating 26 are electrically connected to a thin cylindrical coating 28 of conductive material, such as carbon, for example. The coating 28 extends axially and annularly into the neck end portion 14 of envelope 12 and terminates in radially spaced coaxial relationship with the exit end portion of electron gun 24. Thus, the terminal button 25 provides electrical means for maintaining an anode electrode comprising conductive coatings 26 and 28, respectively, and imaging screen 22 at a predetermined electrical potential for accelerating electrons in the beam emanating from gun 24 onto the imaging screen.

Neck end portion 14 terminates at the other end of envelope 12 in a peripherally sealed stem press 30 having extended hermetically through it an array 31 of spaced terminal pins. Although electrical connections to the electrodes of gun 24 are shown as extending directly through the envelope 12 for purposes of clarity, it is to be understood that these electrical connections are made through respective pins of the array 31. For example, terminal pins 34 and 35 of the array 31 may be connected electrically to respective end portions of a filamentary heater element 40 which is supported within an oxide coated cathode cup 42 of the conventional type. Thus, by means of the respective terminal pins 34 and 35, an electrical current may be passed through the heater element 40 to heat the cathode cup 42 up to a suitable temperature for providing a space charge limited emission of electrons therefrom. Accordingly, heater element 40 and cathode cup 42 constitute an electron emitting source for the gun 24.

The cathode cup 42 is disposed insulatingly within a first grid cup electrode 44, and has its closed end positioned adjacent an aperture 46 centrally located in the closed end thereof. Aperture 46 is aligned with a larger diameter aperture 48 centrally disposed in an adjacent closed end of a second grid cup 50, which is insulatingly spaced from the first grid cup 44. Aligned with the aperture 48 is a larger diameter aperture 52 centrally disposed in an adjacent closed end of a hollow focusing cylinder electrode 54 which extends insulatingly into the second grid cup 50. The focusing cylinder 54 extends axially within the neck end portion 14 and has an opposing open end portion which constitutes the exit end portion of gun 24. The exit end portion of gun 24 is disposed coaxially within the adjacent end portion of anode conductive coating 28 and adjacent the entrance end of electromagnetic yoke 29.

The first grid cup 44 constitutes the control grid means of gun 24 and is biased at a predetermined negative potential with respect to the cathode cup 42 for regulating the flow of electrons from the space charge region thereof and into the beam impinging on imaging screen 22. Consequently, electrons emitted from cathode cup 42 are directed to a crossover region located approximately between the apertures 46 and 48, respectively. As a result, the electrons passing through the cross-over region enter the second grid cup 50 in a diverging beam. The second grid cup 50 and the focusing cylinder 54 generally are maintained at respective progressively higher positive potentials with respect to the cathode. As a result, the second grid cup 50 and the focusing cylinder 54 function, in conjunction with the still higher positive potential of the anode electrode, to convert the diverging beam into a converging beam which is focused on a discrete area of the imaging screen 22. Thus, the second grid cup 50, focusing cylinder 54, and the anode electrode comprising respective coatings 26 and 28 constitute beam-forming electrodes which are axially aligned with the electron emitting source of the gun 24.

The external control circuit 11 includes respective polarized voltage sources 56, 58, and 60 having positive terminals connected to anode terminal button 25, focusing cylinder 54, and second grid cup 50, respectively, and having negative terminals connected to electrical ground. Circuit 11 also includes a polarized voltage source 62 having a negative terminal connected through a resistor 63 to control grid cup 44, and having a positive terminal connected to electrical ground. The cathode cup 42 is connected through a current sampling resistor 64 of a sensing means 65 and through electrical ground to the grounded terminals of voltage sources 56, 58, 60 and 62, respectively. The sensing means 65 includes a reference voltage source 66 comprising a polarized voltage source 67 connected across a resistive element of a potentiometer 68, and having a negative terminal connected through a conductor 70 to the grounded terminal of current sampling resistor 64. Sensing means 65 also includes a conventional comparator amplifier device 74 having an input conductor 72 connected to the junction of current sampling resistor 64 and cathode cup 42. Another input conductor 76 of camparator device 74 is connected to a slidable tap of potentiometer 68 which provides a selected reference voltage input signal. An output conductor 77 of comparator 74 is connected through a filter limiter 78 to an input conductor 79 of an automatically adjustable heater current source 84, such as Model No. QRD 15-2 made by Sorensen Company, a subsidiary of Raytheon Company of Lexington, Massachusetts, for example. The current source 84 of sensing means 65 has a pair of output conductors 80 and 82 connected to respective terminal end portions of filamentary heater element 40.

In operation, the electron beam emanating from gun 24 has a predetermined cathode current value, such as four hundred microamperes, for example, to provide the focused beam impinging on a spot area of imaging screen layer 22 with sufficient current density for producing a bright visible spot viewable through faceplate 20. Consequently, the current source 84 is adjusted to send the necessary level of heating current through the filamentary element 40 for heating the cathode cup 42 to a suitable temperature for producing the required space charge limited emission of electrons. In order to extend the useful life of cathode cup 42, it is preferable to heat the cup 42 to a temperature where temperature limited emission terminates and space charge emission of electrons is just adequate for providing the desired cathode current.

Polarized voltage source 62 has the required value for maintaining the control grip cup 44 at a predetermined negative bias potential, such as negative thirty-five volts, for example, for permitting the passage of the predetermined cathode current of electrons from the space charge region of cup 42 and through the aperture 46. The polarized voltages sources 56, 58, and 60 have respective required values for maintaining the anode electrode of tube 10, focusing cylinder 54, and second grid cup electrode 50 at predetermined positive potentials, such as twenty thousand volts, four thousand volts, and five hundred volts, respectively, for examples, relative to the potential of cathode cup 42. As a result, these beam forming electrodes direct the cathode current of electrons passed through the aperture 46 into a beam which is focused on to a spot area of imaging screen layer 22. The smaller the spot area; the better the resolution of the resulting image produced on imaging screen layer 22.

In similar tubes of the prior art, it has been found that over a period of time the cathode current decreases from its necessary predetermined value. An attempt to return the cathode current to the predetermined level by making the control grid bias voltage less negative with respect to cathode cup 42 causes the resulting spot on imaging screen layer 22 to increase in size, thereby degrading resolution. Investigation disclosed that the increase in spot size was traceable to electron emission from cathode cup 42 decreasing from space charge limitation to temperature limited emission. This decrease in electron emission may be due to a change in the work function of the cathode coating or to a change in heating effect of the filamentary element 40.

It has been found that space charge limited emission from cathode cup 42 provides a bell-shaped distribution of electrons, the apex of which is disposed adjacent the center of aperture 46. Consequently, the space charge limited mode of operation is desirable for focusing the electrons passed through aperture 46 on a minimized spot area of imaging screen layer 22. On the other hand, temperature limited emission from cathode cup 42 provides a mesa-like distribution of electrons. Adjusting the control grid bias voltage to a less negative value causes the mesa-like distribution of electrons to spread laterally with respect to the aperture 46. As a result, the spot produced on imaging screen layer 22 increases in size, and resolution is degraded accordingly. Therefore, the circuit 11 is provided with sensing means 65 for automatically maintaining the cathode current at the predetermined level, while the control grid bias potential is maintained at the predetermined initial value.

The cathode current of electrons in the beam emanating from gun 24 and impinging on imaging screen layer 22 flows to electrical ground and passes through the sampling resistor 64 to return to cathode cup 42. Consequently, there is developed across resistor 64 a sampling signal voltage which is applied to the connected input terminal of comparator 74. Within comparator 74, the reference voltage signal applied to the other input terminal is compared to the sampling signal voltage to derive a differential output voltage signal. This differential voltage signal is applied through filter limiter 78 to the connected input terminal of heater current source 84. As a result, the heater current source 84 is automatically adjusted to vary the current passing through heater element 40 and increase the electron emitting temperature of cathode cup 42. Thus, the increased temperature of cathode cup 42 causes it to return automatically to a space charge limited mode of operation, where electron emission is adequate to provide the predetermined cathode current at the predetermined control grid bias voltage. Also, the beam forming anode, focusing, and second grid electrodes are maintained at their respective predetermined potentials for focusing the electrons passed through aperture 46 onto a minimized spot area of imaging screen layer 22 to provide maximum resolution in the resulting image.

The described feedback control circuit 11 is suitable for use with any cathode ray type tube having electrodes maintained at respective constant electrical potentials, such as a flying spot scanner type of cathode ray tube, for example. However, when the cathode current is modulated, as in television, radar, and photorecording types of cathode ray tubes, for examples, the feedback control of heater current source 80 and cathode cup 42 may be used intermittently to monitor cathode current.

Figure 2:
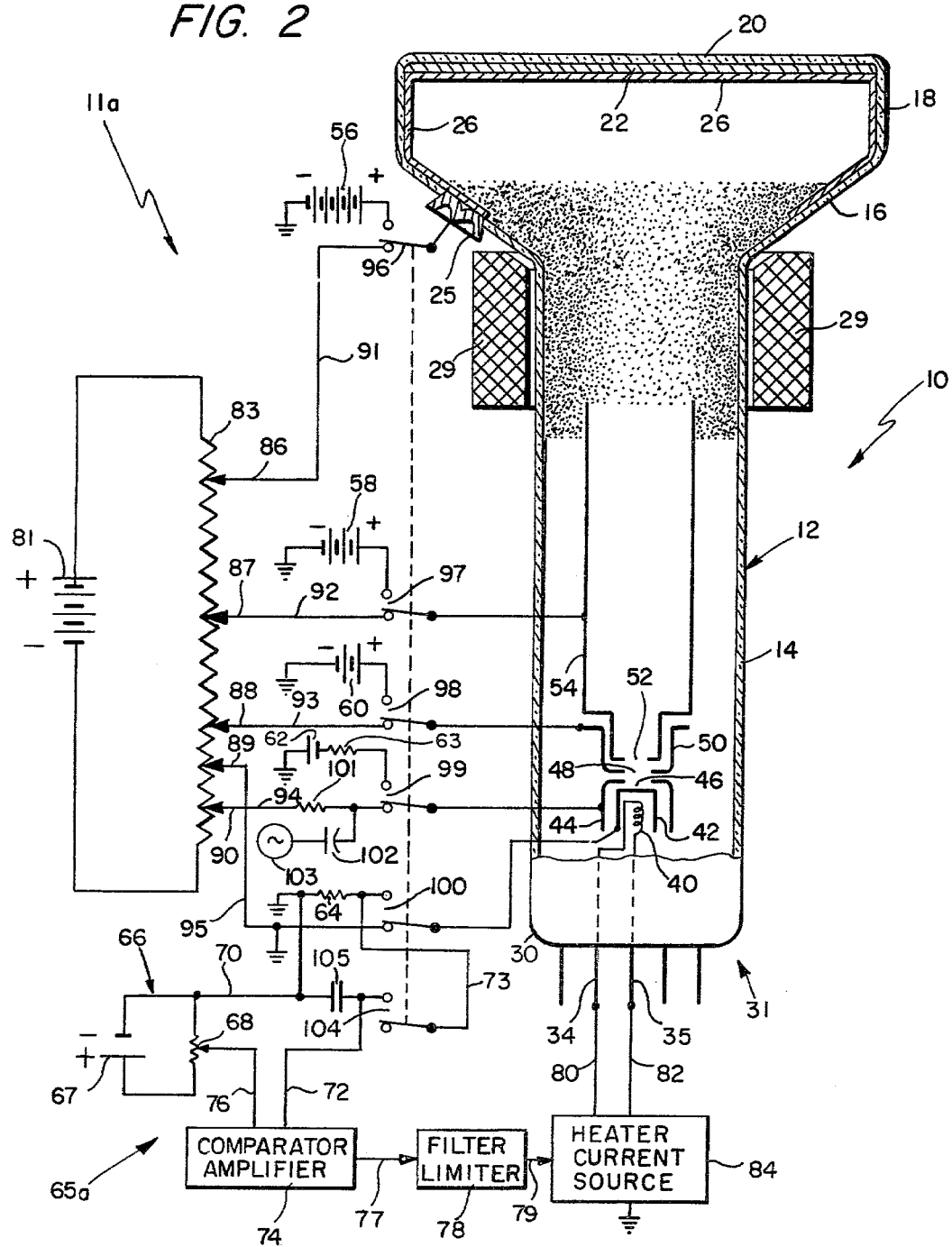
FIG. 2 is a similar view of an alternative embodiment of the invention.

As shown in FIG. 2, the tube 10 may be connected to an external control circuit 11a including a polarized voltage source 81 connected across a resistive element 83 having progressively less positive portions slidably engaged by respective taps 86, 87, 88, 89, and 90. The tap 86 is connected through a conductor 91 to a fixed contact of a gang switch member 96 having a movable contact arm connected to anode terminal button 25 of tube 10. Another fixed contact of the switch member 96 is connected to the positive terminal of polarized voltage source 56, which has its negative terminal connected to electrical ground. Tap 87 is connected through a conductor 92 to a fixed contact of another gang switch member 97 having a movable contact arm connected to focusing cylinder 54 of tube 10. Another fixed contact of switch member 97 is connected to the positive terminal of polarized voltage source 58, which has its negative terminal connected to electrical ground. The tap 88 is connected through a conductor 93 to a fixed contact of another gang switch member 98 having a movable arm connected to the second grid cup 50 of tube 10. Another fixed contact of switch member 98 is connected to the positive terminal of polarized voltage source 60, which has its negative terminal connected to electrical ground.

The tap 89 is connected through a grounded conductor 95 to a fixed contact of another gang switch member 100 having a movable contact arm connected to the cathode cup 42 of tube 10. Another fixed contact of switch member 100 is connected to electrical ground through a current sampling resistor 64 of a sensing means 65a. Sensing means 65a is similar to sensing means 65 except the ungrounded end of resistor 64 is electrically connected through a conductor 73 to a movable contact arm of another gang switch member 104, which engages an open contact when tube 10 is operated in the conventional mode. Another fixed contact of switch member 104 is electrically connected to input conductor 72 of comparator 74 and through a holding capacitor 105 to the grounded end of resistor 64. Tap 90 is connected through a resistor 101 to a fixed contact of a gang switch member 99, and to one terminal of a capacitor 102 which has another terminal connected to a modulating signal voltage source 103. Another fixed contact of switch member 99 is connected through resistor 63 to the negative terminal of polarized voltage source 62, the positive terminal of which is connected to electrical ground.

Thus, in the conventional mode of operation shown in FIG. 2, the respective gang switch members 96–100 have their movable contact arms engaging the fixed contacts connected to adjustable taps 86–90, respectively. Consequently, the respective electrical potentials of the anode, focusing, second grid, and first grid electrodes of tube 10 may be varied, as desired, with respect to the potential of cathode cup 42. Also, a modulating voltage signal from source 103 varies the potential of control grid cup 44 with respect to the potential of the cathode for altering the cathode current passing through the aperture 46 correspondingly. As a result, the instantaneous current density of the electron beam impinging on an associated spot area of imaging screen layer 22 is varied accordingly, such that the scanning electron beam produces a composite visible image which is viewable through faceplate 20.

However, the movable contact arms of gang switch members 96-100 and 104 are coupled to one another for simultaneous movement into electrical engagement with the respective other fixed contacts of the switch members when desired. With the gang switch members 96-100 thus actuated, the anode, focusing, and grid electrodes are electrically connected to the respective polarized voltage sources 56, 58, 60, and 62, as previously described for the embodiment shown in FIG. 1. Also, the cathode cup 42 is electrically connected through the switch member 100 to the current sampling resistor 64 and through switch member 104 to holding capacitor 105 and to the connected input conductor 72 of comparator 74. As a result, capacitor 105 is charged to retain the developed voltage sampling signal on the input conductor 72 when tube 10 is in the conventional mode of operation, and heater current source 84 is automatically adjusted, as previously described, for maintaining the cathode current at the predetermined level associated with the predetermined value of control grid bias potential. In this instance, the predetermined value of control grid bias potential preferably may be the least negative operating value. Consequently, when restored to the conventional mode of operation shown in FIG. 2, the modulating signal voltage from source 103 may drive the control grid bias potential toward more negative values, where fewer electrons pass through aperture 46 and, as a result, electron emission from the cathode cup 42 remains in the space charge limited mode.

Thus, there has been disclosed herein a cathode current control system comprised of an electron discharge device including a tubular envelope having therein an electron gun disposed to beam a cathode current of electrons onto a spaced anode target electrode, and external circuit means connected to the electrodes of the tube for maintaining the electrodes at respective predetermined electrical potentials and for maintaining the cathode current at a predetermined level associated with the operating condition of the tube. Although the invention has been shown in connection with a display type of cathode ray tube, it also is adaptable for use with other types of tubes having electron guns disposed to beam a cathode current of electrons onto a spaced anode collector electrode, such as microwave tubes and storage tubes, for examples.

From the foregoing, it may be seen that all of the objectives of this invention have been achieved by the cathode current control system disclosed herein. However, it also will be apparent that various changes may be made by those skilled in the art without departing from the spirit of the invention as expressed in the appended claims. It is to be understood, therefore, that all matter shown and described herein is to be interpreted in an illustrative rather than in a restrictive sense.

What is claimed is:

1. A cathode current control system comprised of an electron discharge device including:
   a tubular envelope,
   an anode electrode supported within the envelope, and
   electron gun means including an electrically heatable cathode and an aligned control grid electrode spaced from the anode electrode within the envelope for beaming a cathode current of electrons to the anode electrode; and
   control circuitry disposed externally of the tube and including
   fixed voltage source means electrically connected between the anode electrode, the control grid electrode, and the cathode for maintaining the anode and the control grid at respective predetermined constant electrical potentials with respect to the cathode; and
   current sensing means electrically connected to the cathode for automatically maintaining the cathode current at a predetermined constant level associated with the predetermined electrical potential of the control grid.

2. A cathode current control system as set forth in claim 1 wherein the voltage source means includes a first polarized voltage source of preselected value having one terminal connected to the control grid electrode and the other terminal connected to the cathode.

3. A cathode current control system as set forth in claim 2 wherein the voltage source means includes a second polarized voltage source of preselected value having a positive terminal connected to the anode electrode and a negative terminal connected to the cathode.

4. A cathode current control system as set forth in claim 1 wherein the current sensing means includes a current sampling resistor connected electrically between the cathode and the voltage source means for developing a current sampling voltage corresponding to the cathode current.

5. A cathode current control system as set forth in claim 4 wherein the current sensing means includes a comparator having an input connected electrically to the current sampling resistor, and includes a reference voltage source connected electrically to another input of the comparator.

6. A cathode current control system as set forth in claim 5 wherein the current sensing means includes an automatically adjustable heater current source connected electrically to the cathode and to the output of the comparator.

7. A cathode current control system as set forth in claim 6 wherein the cathode is of the indirectly heated type having a filamentary heater element connected electrically to the heater current source, and disposed within a cathode cylinder having an external coating of electron emitting material.

8. A cathode current control system as set forth in claim 7 wherein the control grid electrode comprises a cylindrical conductor having therein an aperture aligned with a portion of the cathode cylinder coating.

9. A cathode current control system as set forth in claim 8 wherein the electron discharge device comprises a cathode ray type tube; and the anode electrode includes an anode target layer of fluorescent material.

10. A cathode current control system as set forth in claim 9 wherein the electron gun means includes a series of beam forming electrode means disposed in spaced coaxial alignment with the control grid for focusing electrons passed through the aperture thereof onto a spot area of the anode target layer.

* * * * *

UNITED STATES PATENT OFFICE
CERTIFICATE OF CORRECTION

Patent No. 4,247,801   Dated January 27, 1981

Inventor(s) Andras Dallos, John A. Buckbee and Gordon R. Spencer

It is certified that error appears in the above-identified patent and that said Letters Patent are hereby corrected as shown below:

Column 1, line 68, change "spaced" to --space--;

Column 4, line 67, change "grip" to --grid--;

Column 8, line 10, change "tube" to --device--.

Signed and Sealed this

Eighth Day of September 1981

[SEAL]

*Attest:*

*Attesting Officer*

GERALD J. MOSSINGHOFF

*Commissioner of Patents and Trademarks*